US012567325B2

(12) United States Patent
Kim

(10) Patent No.: US 12,567,325 B2
(45) Date of Patent: Mar. 3, 2026

(54) SYSTEM AND METHOD FOR PREDICTING TRAFFIC INFORMATION

(71) Applicants: HYUNDAI MOTOR COMPANY, Seoul (KR); Kia Corporation, Seoul (KR)

(72) Inventor: Tae Heon Kim, Siheung-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 17/894,277

(22) Filed: Aug. 24, 2022

(65) Prior Publication Data

US 2023/0252890 A1 Aug. 10, 2023

(30) Foreign Application Priority Data

Feb. 8, 2022 (KR) ........................ 10-2022-0016397

(51) Int. Cl.
*G08G 1/01* (2006.01)
*G08G 1/052* (2006.01)

(52) U.S. Cl.
CPC ......... *G08G 1/0129* (2013.01); *G08G 1/0112* (2013.01); *G08G 1/0133* (2013.01); *G08G 1/052* (2013.01)

(58) Field of Classification Search
CPC .. G08G 1/0129; G08G 1/0112; G08G 1/0133; G08G 1/052
USPC .......................................................... 701/118
See application file for complete search history.

(56) References Cited

U.S. PATENT DOCUMENTS

| | | | | |
|---|---|---|---|---|
| 11,079,244 B2 * | 8/2021 | Sun | G08G 1/09685 | |
| 11,620,901 B1 * | 4/2023 | Symes | G06N 3/0442 | 701/118 |
| 2008/0319639 A1 * | 12/2008 | Yamane | G08G 1/0104 | 701/118 |
| 2009/0043486 A1 * | 2/2009 | Yang | G01C 21/3492 | 701/117 |
| 2015/0073689 A1 * | 3/2015 | Hampapur | G08G 1/0145 | 701/118 |
| 2019/0354108 A1 * | 11/2019 | Okajima | B60R 21/00 | |
| 2019/0378405 A1 * | 12/2019 | Lee | G06N 20/00 | |
| 2020/0136975 A1 * | 4/2020 | Arora | H04L 43/062 | |
| 2020/0175855 A1 * | 6/2020 | Park | G08G 1/096827 | |
| 2020/0211373 A1 * | 7/2020 | Ikemoto | G08G 1/0137 | |
| 2021/0134152 A1 * | 5/2021 | Huang | G01C 21/3492 | |
| 2022/0095164 A1 * | 3/2022 | Xu | H04L 47/83 | |
| 2022/0180745 A1 * | 6/2022 | Banaei-Kashani | G08G 1/096725 | |
| 2022/0292955 A1 * | 9/2022 | Takasaki | G08G 1/0112 | |
| 2022/0383738 A1 * | 12/2022 | Lyu | G08G 1/0145 | |
| 2022/0410879 A1 * | 12/2022 | Won | B60W 30/09 | |

(Continued)

*Primary Examiner* — Krishnan Ramesh
(74) *Attorney, Agent, or Firm* — MORGAN, LEWIS & BOCKIUS LLP

(57) ABSTRACT

A system and method for predicting traffic information are disclosed. The system includes a plurality of vehicles that transmits information obtained while traveling in a specified section, and a server that generates processed information based on the information received from the plurality of vehicles, predicts a traffic volume of the specified section at a first time point based on a traffic volume of the specified section and the processed information, and calculates a time required to travel the specified section based on the predicted traffic volume.

10 Claims, 5 Drawing Sheets

(56) References Cited

U.S. PATENT DOCUMENTS

2023/0202333 A1* 6/2023 Yokoyama .............. B60L 53/64
320/109

* cited by examiner

SYSTEM AND METHOD FOR PREDICTING TRAFFIC INFORMATION

CROSS-REFERENCE TO RELATED APPLICATION

This application claims the benefit of priority to Korean Patent Application No. 10-2022-0016397, filed in the Korean Intellectual Property Office on Feb. 8, 2022, the entire contents of which are incorporated herein by reference.

TECHNICAL FIELD

The present disclosure relates to a system and method for predicting traffic information.

BACKGROUND

In general, for a scheme of predicting traffic information by predicting a traffic volume (demand), a scheme of predicting the inflow and outflow of vehicles for each section in a current time-space graph at a current time point and analyzing a traffic pattern is applied. The scheme of predicting the inflow and outflow of vehicles and analyzing a traffic pattern uses a past traffic pattern for a section.

However, such a scheme has limitations in predicting future traffic volume. Accordingly, it is required to develop a technology for predicting a traffic volume at a future time point.

SUMMARY

The present disclosure has been made to solve the above-mentioned problems occurring in the prior art while advantages achieved by the prior art are maintained intact.

An aspect of the present disclosure provides a system and method for predicting traffic information capable of predicting a traffic volume at a future time point and calculating a travel time for each section.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for predicting traffic information includes a plurality of first vehicles that transmits information obtained while traveling in a specified section, and a server that generates processed information based on the information received from the plurality of first vehicles, predicts a first traffic volume of the specified section at a first time point based on a traffic volume of the specified section and the processed information, and calculates a time required to travel the specified section based on the predicted first traffic volume.

The server may generate, as the processed information, probe speeds obtained while the plurality of vehicles travel the specified section for a preset time period before the first time point and an average of the probe speeds.

The preset time period may include a first time period from a second time point that is before the first time point and a second time period from a third time point when the first time period has elapsed from the second time point.

The server may predict a second traffic volume of the second time period based on processed information of the first time period by using a trend-based demand prediction model.

The server may predict, as the first traffic volume, a traffic volume utilizing the trend-based demand prediction model at the first time point when a difference between the predicted second traffic volume and a traffic volume driven in the specified section for the second time period is less than a threshold.

The server may predict, as the first traffic volume, an average of traffic volume driven in the specified section for the preset time period when a difference between the predicted second traffic volume and a traffic volume driven in the specified section for the second time period is equal to or greater than a threshold.

The trend-based demand prediction model may include a model based on a time series regression model to predict at least one of the first and second traffic volumes.

The server may calculate the required time by applying the predicted first traffic volume to a Bureau of public roads (BPR) function.

The server may transmit the calculated required time to a vehicle including a second vehicle and/or at least one of the plurality of first vehicles.

The vehicle may output the calculated required time from the server.

According to another aspect of the present disclosure, a method of predicting traffic information includes receiving, by a server, information from a plurality of first vehicles, wherein the information is obtained while the plurality of first vehicles travels in a specified section, generating, by the server, processed information based on the information received from the plurality of first vehicles, predicting, by the server, a first traffic volume of the specified section at a first time point based on a traffic volume driven in the specified section and the processed information, and calculating, by the server, a time required to travel the specified section based on the predicted first traffic volume.

The generating of the processed information may include generating, as the processed information, by the server, probe speeds obtained while the plurality of vehicles travel the specified section for a preset time period before the first time point and an average of the probe speeds.

The preset time period may include a first time period from a second time point that is before the first time point and a second time period from a third time point when the first time period has elapsed from the second time point.

The predicting of the first traffic volume may include predicting, by the server, a second traffic volume of the second time period based on the processed information of the first time period by using a trend-based demand prediction model.

The predicting of the first traffic volume may include predicting, as the first traffic volume, by the server, a traffic volume utilizing the trend-based demand prediction model at the first time point when a difference between the predicted second traffic volume and a traffic volume driven in the specified section for the second time period is less than a threshold.

The predicting of the first traffic volume may include predicting, as the first traffic volume, by the server, an average of traffic volume driven in the specified section for the preset time period when a difference between the predicted second traffic volume and a traffic volume driven in the specified section for the second time period is equal to or greater than a threshold.

The trend-based demand prediction model may include a model based on a time series regression model to predict at least one of the first and second traffic volumes.

The calculating of the required time may include calculating, by the server, the required time by applying the predicted first traffic volume to a Bureau of public roads (BPR) function.

The method may further include transmitting, by the server, the calculated required time to a vehicle including a second vehicle and/or at least one of the plurality of first vehicles.

The method may further include outputting, by the vehicle, the calculated required time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
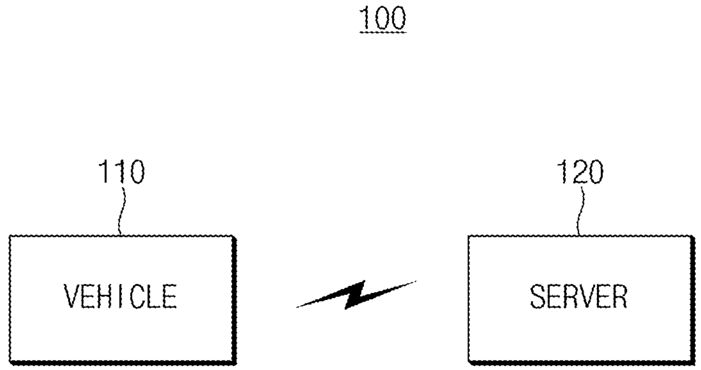
FIG. 1 is a diagram illustrating the configuration of a system for predicting traffic information according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function may be omitted when it may interfere with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating the configuration of a system for predicting traffic information according to an embodiment of the present disclosure.

As shown in FIG. 1, a system 100 for predicting traffic information according to an embodiment of the present disclosure may include a vehicle 110 and a server 120.

The vehicle 110 may include a probe vehicle (e.g., first vehicle) capable of transmitting the location of a vehicle, driving information, and route information passing through a road link to another vehicle or a server. According to an embodiment, the vehicle 110 may transmit information (driving information) obtained while driving a specified section to the server 120. For a more detailed description of the vehicle 110, refer to FIG. 2.

The server 120 may calculate the time required to drive a specified section at a first time point in future based on information obtained from the plurality of vehicles 110. For a more detailed description, refer to FIG. 3.

Figure 2:
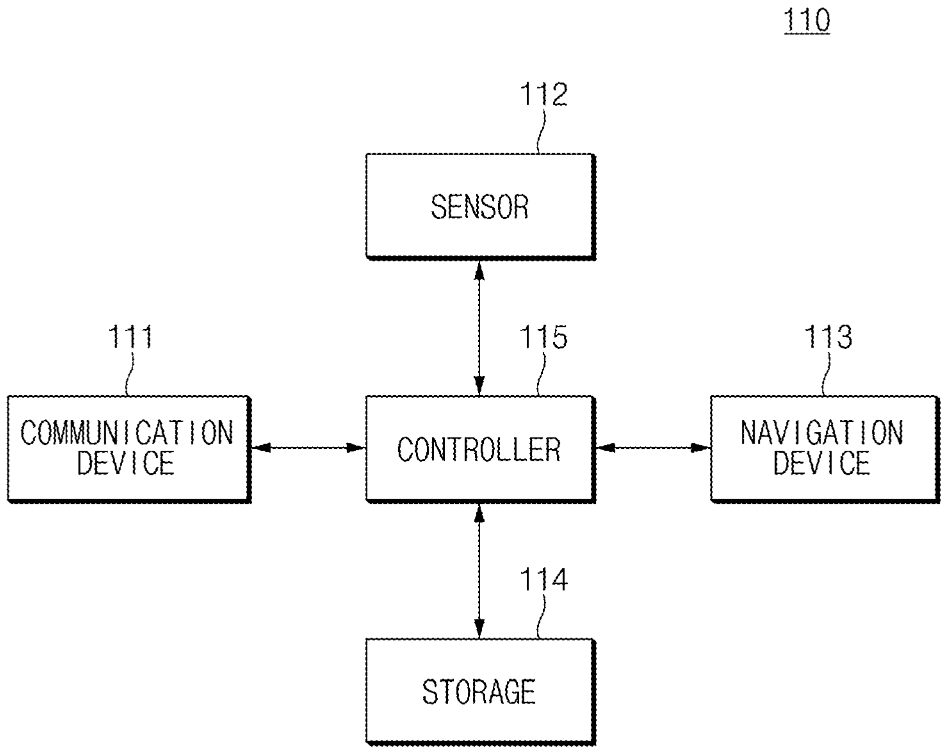
FIG. 2 is a diagram illustrating the configuration of a vehicle according to an embodiment of the present disclosure.

FIG. 2 is a diagram illustrating the configuration of a vehicle according to an embodiment of the present disclosure.

As shown in FIG. 2, the vehicle 110 may include a communication device 111, a sensor 112, a navigation device 113, storage 114, and a controller 115.

The communication device 111 may communication with the server 120 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The sensor 112 may obtain driving information of a vehicle. According to an embodiment, the sensor 112 may obtain a probe speed and may include a vehicle speed sensor for detecting a probe speed.

The navigation device 113 may include a GPS receiver to receive the current location of a vehicle, and may provide a route to a destination and a predicted arrival time based on the current location of the vehicle. The navigation device 113 may include a separate output device to output provided information, and according to an embodiment, the output device may include a display device and a sound output device.

The storage 114 may store at least one algorithm for performing operations or executions of various commands for the operation of a vehicle according to an embodiment of the present disclosure. The storage 114 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 115 may be implemented with various processing devices such as a microprocessor and the like in which a semiconductor chip capable of performing operations or executions of various commands is built-in, and may control operations of a vehicle according to an embodiment of the present disclosure.

The controller 115 may collect driving information obtained by the sensor 112 and vehicle location information obtained by the navigation device 113 while driving a specified section, and transmit the collected information to the server 120. In addition, when the time required to drive a specified section is received from the server 120, the controller 115 may control to output the required time. In addition, the controller 115 may calculate the predicted time of arrival to the destination by reflecting the required time.

Figure 3:
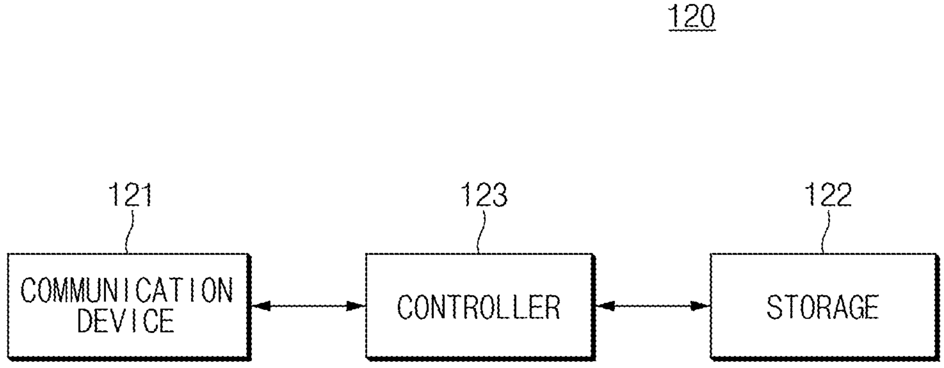
FIG. 3 is a diagram illustrating the configuration of a server according to an embodiment of the present disclosure.

FIG. 3 is a diagram illustrating the configuration of a server according to an embodiment of the present disclosure.

As shown in FIG. 3, the server 120 may include a communication device 121, storage 122, and a controller 123.

The communication device 121 may be in communication with the plurality of vehicles 110 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 122 may store at least one algorithm for performing operations or executions of various commands for the operation of a server according to an embodiment of the present disclosure. The storage 122 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 123 may be implemented with various processing devices such as a microprocessor and the like in which a semiconductor chip capable of performing operations or executions of various commands is built-in, and may control operations of a server according to an embodiment of the present disclosure.

The controller 123 may generate processed information based on driving information and location information obtained while driving a specified section among the information received from the plurality of vehicles 110.

According to an embodiment, the controller 123 may collect driving information and location information obtained while the plurality of vehicles drive in a specified section for a preset time period before a first time point (future time point), and based on the collected information, generate processed information including a probe speed of each vehicle and the average of the probe speeds. In this case, the preset time period may include a first time period from a second time point before the first time point, and may include a second time period from a third time point to a fourth time when the first time period has elapsed from the second time point. The first time period may be same as the second time period.

In addition, the controller 123 may calculate the traffic volume driven in a specified section for a preset time period. In this case, the traffic volume may mean the number of vehicles (the number of probe vehicles) passing through a specified section per hour.

The controller 123 may predict the traffic volume (e.g., second traffic volume) of the second time period based on the processed information of the first time period by using a trend-based demand prediction model. In this case, the trend-based demand prediction model may include a model for predicting a traffic volume (e.g., at least one of the first and second traffic volumes) based on a time series regression model.

When the difference between the predicted traffic volume of the second time period and the traffic volume (actual traffic volume) driven in the specified section for the second time period is less than a threshold, the controller 123 may determine that the trends in the predicted traffic volume for the second time period and the traffic volume (actual traffic volume) driven in the specified section are consistent. That is, the controller 123 may determine that the traffic volume predicted by using the trend-based demand prediction model corresponds to the actual traffic volume and trust the trend-based demand prediction model, such that it is possible to calculate the traffic volume predicted based on the trend-based demand prediction model as the traffic volume (e.g., first traffic volume) of the specified section at the first time point.

Meanwhile, when the difference between the predicted traffic volume of the second time period and the traffic volume (actual traffic volume) driven in the specified section for the second time period is equal to or greater than a threshold, the controller 123 may determine that the trends in the predicted traffic volume for the second time period and the traffic volume (actual traffic volume) driven in the specified section are inconsistent. That is, the controller 123 may determine that the traffic volume predicted by using the trend-based demand prediction model does not correspond to the actual traffic volume, does not trust the trend-based demand prediction model, and predict the average of the traffic volume driven in the specified section during the preset time period as the traffic volume of the specified section at the first time point.

When the traffic volume at the first time point is predicted, the controller 123 may calculate the time required to pass through the specified section at the first time point by applying the predicted traffic volume to a Bureau of public roads (BPR) function. The BPR function may be expressed as following Equation 1.

$$T = T_0\left(1 + \alpha\left(\frac{v}{c}\right)^{\beta}\right) \quad \text{〈Equation 1〉}$$

T=time required to pass through a specified section (link)

$T_0$=time required to pass through a specified section without obstacles (fixed value)

v=predicted traffic volume c=traffic volume that may pass through a specified section per hour (fixed value)

α and β=linear coefficients

The controller 123 may calculate the required time required to pass through the specified section for the second time period based on the driving information and location information obtained while driving the specified section for the second time period, apply the calculated required time to 'T', and the predicted traffic volume of the second time period to 'v' to calculate linear coefficients α and β.

The controller 123 may calculate the time required to pass through the specified section at the first time point by applying the linear coefficient calculated in the above-described manner and applying the predicted traffic volume at the first time point to Equation 1.

When the required time is calculated, the controller 123 may transmit the required time to the vehicle. In this case, the vehicle may include a plurality of vehicles (probe vehicles) that provide vehicle information, and may include another vehicle (e.g., a second vehicle) that requests traffic information.

According to an embodiment of the present disclosure, in addition to the above-described method, the controller 123 may predict the required time by using a model for calculating the required time based on machine learning based on the predicted traffic volume at the first time point.

Figure 4:
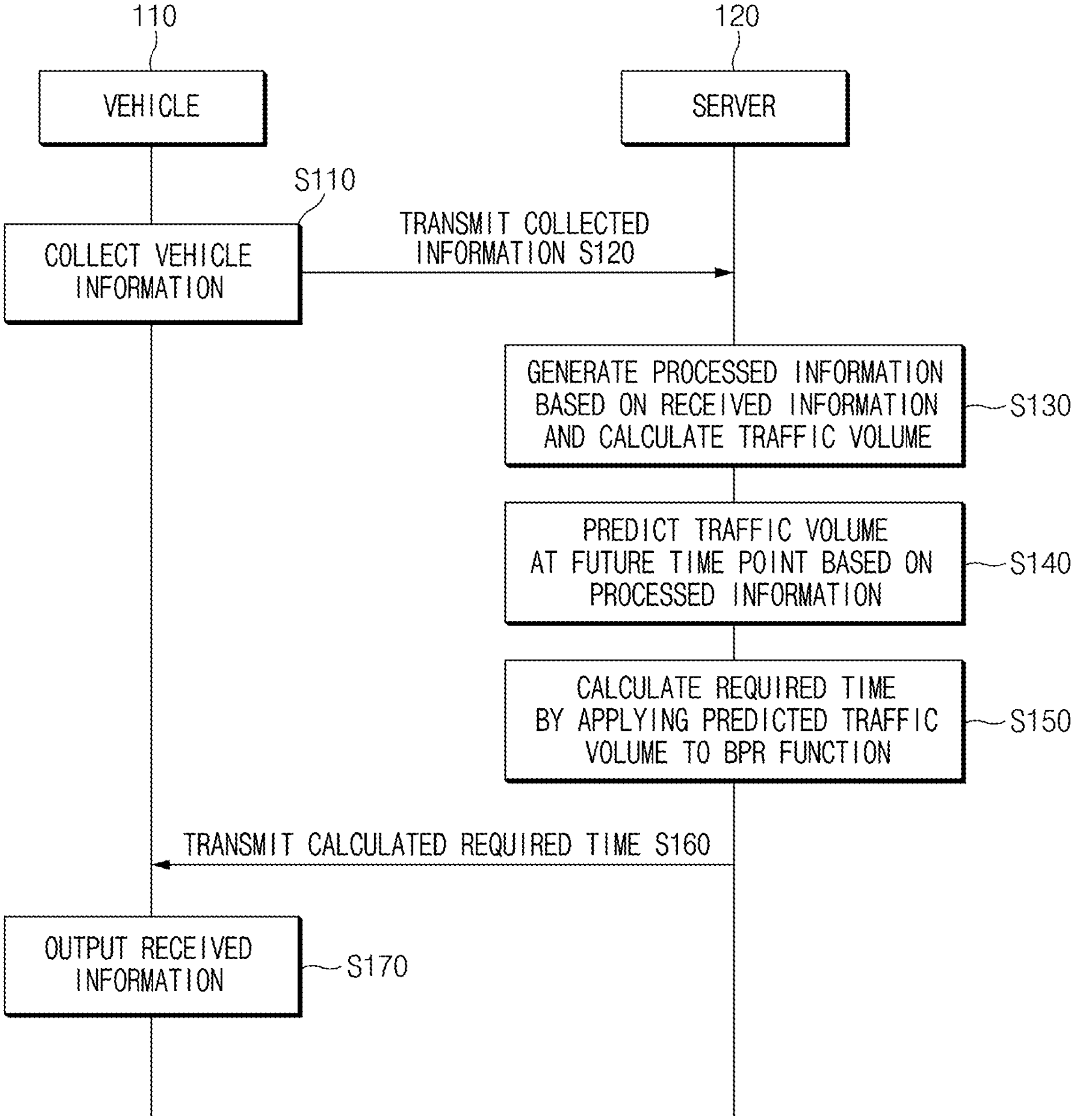
FIG. 4 is a flowchart illustrating a method of predicting traffic information according to an embodiment of the present disclosure.

FIG. 4 is a flowchart illustrating a method of predicting traffic information according to an embodiment of the present disclosure.

As shown in FIG. 4, in S110, the vehicle 110 may collect driving information obtained by the sensor 112 and vehicle location information obtained by the navigation device 113 while driving a specified section.

In S120, the vehicle 110 may transmit the collected information to the server 120. In S120, the server 120 may receive information collected from the plurality of vehicles 110.

In S130, the server 120 may generate processed information based on the received information. According to the embodiment, in S130, the server 120 may generate the processed information based on the driving information and the location information obtained while driving the specified section among the information received from the plurality of vehicles 110.

In S130, the server 120 may collect the driving information and the location information obtained while the plurality of vehicles drive in the specified section for the preset time period before the first time point (future time point), and may generate the processed information including the probe speed of each vehicle and the average of probe speeds based on the collected information. In this case, the preset time period may include the first time period from the second time point that is before the first time point, and may include the second time period from the third time point to the fourth time point when the first time period has elapsed from the second time point. The first time period may be same as the second time period.

In addition, the server 120 may calculate the traffic volume driven in the specified section for the preset time period. In this case, the traffic volume may mean the number of vehicles (the number of probe vehicles) passing through the specified section.

In S140, the server 120 may predict the traffic volume at the first point in time (future time) based on the processed information (S140).

In S140, the server 120 may predict the traffic volume for the second time period based on the processed information of the first time period by using the trend-based demand prediction model. In this case, the trend-based demand prediction model may include a model for predicting a traffic volume based on a time series regression model.

When the difference between the predicted traffic volume of the second time period and the traffic volume (actual traffic volume) driven in the specified section for the second time period is less than a threshold, in S140, the server 120 may determine that the trends in the predicted traffic volume for the second time period and the traffic volume (actual traffic volume) driven in the specified section are consistent. That is, the server 120 may determine that the traffic volume predicted by using the trend-based demand prediction model corresponds to the actual traffic volume and trust the trend-based demand prediction model, such that it is possible to calculate the traffic volume predicted based on the trend-based demand prediction model as the traffic volume of the specified section at the first time point.

Meanwhile, when the difference between the predicted traffic volume of the second time period and the traffic volume (actual traffic volume) driven in the specified section for the second time period is equal to or greater than a threshold, the server 120 may determine that the trends in the predicted traffic volume for the second time period and the traffic volume (actual traffic volume) driven in the specified section are inconsistent. That is, the server 120 may determine that the traffic volume predicted by using the trend-based demand prediction model does not correspond to the actual traffic volume, does not trust the trend-based demand prediction model, and predict the average of the traffic volume driven in the specified section during the preset time period as the traffic volume of the specified section at the first time point.

When the traffic volume at the first time point is predicted, in S150, the server 120 may calculate the time required to pass through the specified section at the first time point by applying the predicted traffic volume to a Bureau of public roads (BPR) function. The BPR function may be expressed as Equation 1.

In S150, the server 120 may calculate the required time required to pass through the specified section for the second time period based on the driving information and location information obtained while driving the specified section for the second time period, apply the calculated required time to 'I', and the predicted traffic volume of the second time period to 'v' to calculate linear coefficients $\alpha$ and $\beta$.

In S150, the server 120 may calculate the time required to pass through the specified section at the first time point by applying the linear coefficient calculated in the above-described manner and applying the predicted traffic volume at the first time point to Equation 1.

According to an embodiment of the present disclosure, in S150, in addition to the above-described method, the controller 123 may predict the required time by using a model for calculating the required time based on machine learning based on the predicted traffic volume at the first time point.

When the required time required to pass through the specified section at the first time point is calculated, in S160, the server 120 may transmit the required time to the vehicle 110.

When the vehicle 110 receives the required time required to travel a specified section from the server 120, the vehicle 110 may control to output the required time in S170. In addition, the vehicle 110 may calculate the predicted time of arrival to the destination by reflecting the required time.

Figure 5:
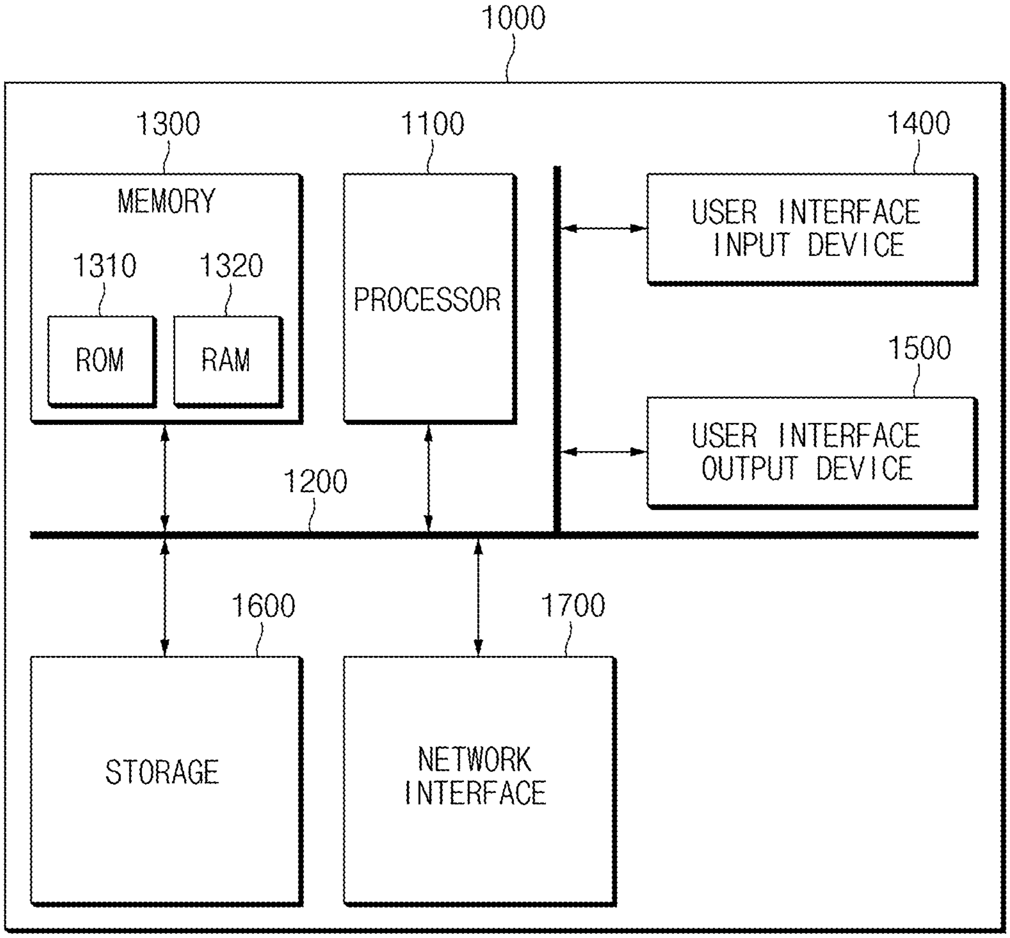
FIG. 5 is a diagram illustrating a computing system for executing a method according to an embodiment of the present disclosure.

FIG. 5 is a diagram illustrating a computing system for executing a method according to an embodiment of the present disclosure.

Referring to FIG. 5, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The system and method for predicting a traffic volume at a future time point according to an embodiment of the present disclosure can improve the convenience of a driver by predicting the traffic volume at a future time point and calculating the travel time for each section.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for predicting traffic information, the system comprising:
- a plurality of first vehicles configured to transmit information obtained while traveling in a specified section for a preset time period; and
- a server configured to:
  - generate processed information based on the information received from the plurality of first vehicles,
  - predict a first traffic volume of the specified section at a first time point based on a traffic volume of the specified section and the processed information, and
  - calculate a time required to travel the specified section based on the predicted first traffic volume,
- wherein the information obtained while traveling in the specified section includes driving information obtained by a sensor of the plurality of first vehicles while traveling in the specified section,
- wherein a vehicle is configured to output the calculated required time through an output device and the vehicle includes a second vehicle and/or at least one of the plurality of first vehicles,
- wherein the preset time period includes:
  - a first time period from a second time point that is before the first time point and
  - a second time period from a third time point when the first time period has elapsed from the second time point,
- wherein the server is configured to:
  - predict a second traffic volume of the second time period based on processed information of the first time period by using a trend-based demand prediction model;
  - calculate a required time to pass through the specified section for the second time period;
  - calculate linear coefficients of a Bureau of public roads (BPR) function by applying the calculated required time and the predicted second traffic volume of the second time period to the BPR function;
  - calculate the time required to travel the specified section at the first time point by applying the calculated linear coefficients of the BPR function and the predicted first traffic volume at the first time point; and
  - transmit the calculated required time to the vehicle,
  - wherein the vehicle receives the calculated required time to travel the specified section at the first time point from the server and calculates a predicted time of arrival to a destination by reflecting the calculated required time.

2. The system of claim 1, wherein the server is configured to generate, as the processed information:
- probe speeds obtained while the plurality of first vehicles travel the specified section for the preset time period before the first time point, and
- an average of the probe speeds.

3. The system of claim 1, wherein the server is configured to predict, as the first traffic volume, a traffic volume utilizing the trend-based demand prediction model at the first time point when a difference between the predicted second traffic volume and a traffic volume driven in the specified section for the second time period is less than a threshold.

4. The system of claim 1, wherein the server is configured to predict, as the first traffic volume, an average of traffic volume driven in the specified section for the preset time period when a difference between the predicted second traffic volume and a traffic volume driven in the specified section for the second time period is equal to or greater than a threshold.

5. The system of claim 1, wherein the trend-based demand prediction model includes a model based on a time series regression model to predict at least one of the first and second traffic volumes.

6. A method of predicting traffic information, the method comprising:
- receiving, by a server, information from a plurality of first vehicles, wherein the information is obtained while the plurality of first vehicles travels in a specified section for a preset time period;
- generating, by the server, processed information based on the information received from the plurality of first vehicles;
- predicting, by the server, a first traffic volume of the specified section at a first time point based on a traffic volume driven in the specified section and the processed information;
- calculating, by the server, a time required to travel the specified section based on the predicted first traffic volume; and
- outputting, by a vehicle, the calculated required time through an output device, wherein the vehicle includes a second vehicle and/or at least one of the plurality of first vehicles,
- wherein the information obtained while traveling in the specified section includes driving information obtained by a sensor of the plurality of first vehicles while traveling in the specified section,
- wherein the preset time period includes:
  - a first time period from a second time point that is before the first time point and
  - a second time period from a third time point when the first time period has elapsed from the second time point,
- wherein the predicting of the first traffic volume includes:
  - predicting, by the server, a second traffic volume of the second time period based on processed information of the first time period by using a trend-based demand prediction model,
- wherein the calculating of the required time includes:
  - calculating, by the server, a required time to pass through the specified section for the second time period;

calculating, by the server, linear coefficients of a Bureau of public roads (BPR) function by applying the calculated required time and the predicted second traffic volume of the second time period to the BPR function;

calculating, by the server, the time required to travel the specified section at the first time point by applying the calculated linear coefficients of the BPR function and the predicted first traffic volume at the first time point;

transmitting, by the server, the calculated required time to the vehicle;

receiving, by the vehicle, the calculated required time to travel the specified section at the first time point from the server; and calculating, by the vehicle, a predicted time of arrival to a destination by reflecting the calculated required time.

7. The method of claim 6, wherein the generating of the processed information includes:

generating, as the processed information, by the server:

probe speeds obtained while the plurality of first vehicles travel the specified section for the preset time period before the first time point and an average of the probe speeds.

8. The method of claim 6, wherein the predicting of the first traffic volume includes:

predicting, as the first traffic volume, by the server, a traffic volume utilizing the trend-based demand prediction model at the first time point when a difference between the predicted second traffic volume and a traffic volume driven in the specified section for the second time period is less than a threshold.

9. The method of claim 6, wherein the predicting of the first traffic volume includes:

predicting, as the first traffic volume, by the server, an average of traffic volume driven in the specified section for the preset time period when a difference between the predicted second traffic volume and a traffic volume driven in the specified section for the second time period is equal to or greater than a threshold.

10. The method of claim 6, wherein the trend-based demand prediction model includes a model based on a time series regression model to predict at least one of the first and second traffic volumes.

* * * * *